(12) United States Patent
Chen et al.

(10) Patent No.: US 12,404,940 B2
(45) Date of Patent: Sep. 2, 2025

(54) MULTI-PORT VALVE AND THERMAL MANAGEMENT SYSTEM HAVING MULTI-PORT VALVE

(71) Applicant: JOHNSON ELECTRIC INTERNATIONAL AG, Murten (CH)

(72) Inventors: Anbang Chen, Shen Zhen (CN); Xiaoyu Liu, Shen Zhen (CN); Ruifeng Qin, Hong Kong (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 0 days.

(21) Appl. No.: 18/538,131

(22) Filed: Dec. 13, 2023

(65) Prior Publication Data

US 2024/0133470 A1 Apr. 25, 2024
US 2024/0229945 A9 Jul. 11, 2024

Related U.S. Application Data

(63) Continuation of application No. PCT/CN2021/109078, filed on Jul. 28, 2021.

(30) Foreign Application Priority Data

Jun. 15, 2021 (CN) .......................... 202121322264.0

(51) Int. Cl.
*F16K 11/085* (2006.01)
*B60H 1/00* (2006.01)
*F16K 27/06* (2006.01)

(52) U.S. Cl.
CPC ...... *F16K 11/0853* (2013.01); *B60H 1/00485* (2013.01); *F16K 27/065* (2013.01)

(58) Field of Classification Search
CPC ............... F16K 11/0853; F16K 27/065; B60H 1/00485
See application file for complete search history.

(56) References Cited

U.S. PATENT DOCUMENTS 11,306,832 B2 * 4/2022 Mermelshtein ..... F16K 11/0853
2015/0196749 A1 7/2015 Ziv et al.

FOREIGN PATENT DOCUMENTS

CN 102563123 A 7/2012
CN 107073253 A 8/2017
(Continued)

OTHER PUBLICATIONS

International Search Report of corresponding PCT Application No. PCT/CN2021/109078 with English translation Mar. 2, 2022.

*Primary Examiner* — Michael R Reid
(74) *Attorney, Agent, or Firm* — Aird & McBurney LP

(57) ABSTRACT

A multi-port valve includes a valve housing and a valve core. The valve housing comprises a cylindrical main body defining an inner cavity to rotatably accommodate the valve core and a plurality of ports in fluid communication with the inner cavity. The valve core defines a plurality of flow channels, each extending through a sidewall of the valve core to form two opposite open ends. The valve housing is provided with a guider passage, and the plurality of flow channels include a first flow channel, a second flow channel and a third flow channel. The multi-port valve is operable to be switched between a plurality of work modes in response to the valve core rotating to different positions relative to the valve housing. The first flow channel is connected in series with the second flow channel via the guider passage in response to a first work mode of the plurality of work modes. The first flow channel is connected in series with the third flow channel via the guider passage in response to a second work mode of the plurality of work modes.

10 Claims, 4 Drawing Sheets

(56) References Cited

FOREIGN PATENT DOCUMENTS

| | | |
|---|---|---|
| CN | 108291658 A | 7/2018 |
| CN | 208041222 U | 11/2018 |
| CN | 109424766 A | 3/2019 |
| CN | 110843465 A | 2/2020 |
| CN | 210920211 U | 7/2020 |
| FR | 675640 A | 2/1930 |

\* cited by examiner

MULTI-PORT VALVE AND THERMAL MANAGEMENT SYSTEM HAVING MULTI-PORT VALVE

CROSS REFERENCE TO RELATED APPLICATIONS

This non-provisional patent application is a continuation application of PCT Application No. PCT/CN2021/109078, filed with the Chinese Patent Office on Jul. 28, 2021, which claims priority to Chinese Patent Application No. 202121322264.0, filed on Jun. 15, 2021, which are incorporated herein by reference in their entirety.

FIELD OF THE INVENTION

The invention relates to the technical field of valves, in particular to a multi-port valve and a thermal management system having the multi-port valve.

BACKGROUND

A valve is a controlling component in the fluid delivery system, which can be used to control the on-off, flow direction, etc. of the fluid. For example, in the thermal management system of new energy vehicles, valves are usually required to control flow of coolant. A common thermal management system of vehicle includes several cooling circuits (e.g., battery cooling circuits and electric drive system cooling circuits), and several heat exchangers (e.g., radiators and chillers). In real operation of the automotive thermal management system, it is always necessary to integrate multiple cooling circuits and multiple heat exchangers to achieve different work modes. An existing thermal management system of vehicle has several coolant valves to transfer coolant between multiple cooling circuits and/or multiple heat exchangers to achieve different work modes. Such a vehicle thermal management system has a complex structure and high cost.

SUMMARY OF THE INVENTION

The present invention aims to provide a multi-port valve that can solve the above-mentioned problems or at least alleviate the above-mentioned problems to a certain extent, and a thermal management system having the multi-port valve.

In one aspect, the present invention provides a multi-port valve including a valve housing and a valve core. The valve housing comprises a cylindrical main body defining an inner cavity to rotatably accommodate the valve core and a plurality of ports in fluid communication with the inner cavity. The valve core defines a plurality of flow channels, each extending through a sidewall of the valve core to form two opposite open ends. The valve housing is provided with a guider passage, and the plurality of flow channels include a first flow channel, a second flow channel and a third flow channel. The multi-port valve is operable to be switched between a plurality of work modes in response to the valve core rotating to different positions relative to the valve housing. The first flow channel is connected in series with the second flow channel via the guide passage in response to a first work mode of the plurality of work modes. The first flow channel is connected in series with the third flow channel via the guide passage in response to a second work mode of the plurality of work modes.

In another aspect, the present invention provides a thermal management system including the multi-port valve above.

DETAILED DESCRIPTION OF THE PREFERRED EMBODIMENTS

The present invention will be further described below based on the drawings and the embodiments.

Figure 1:
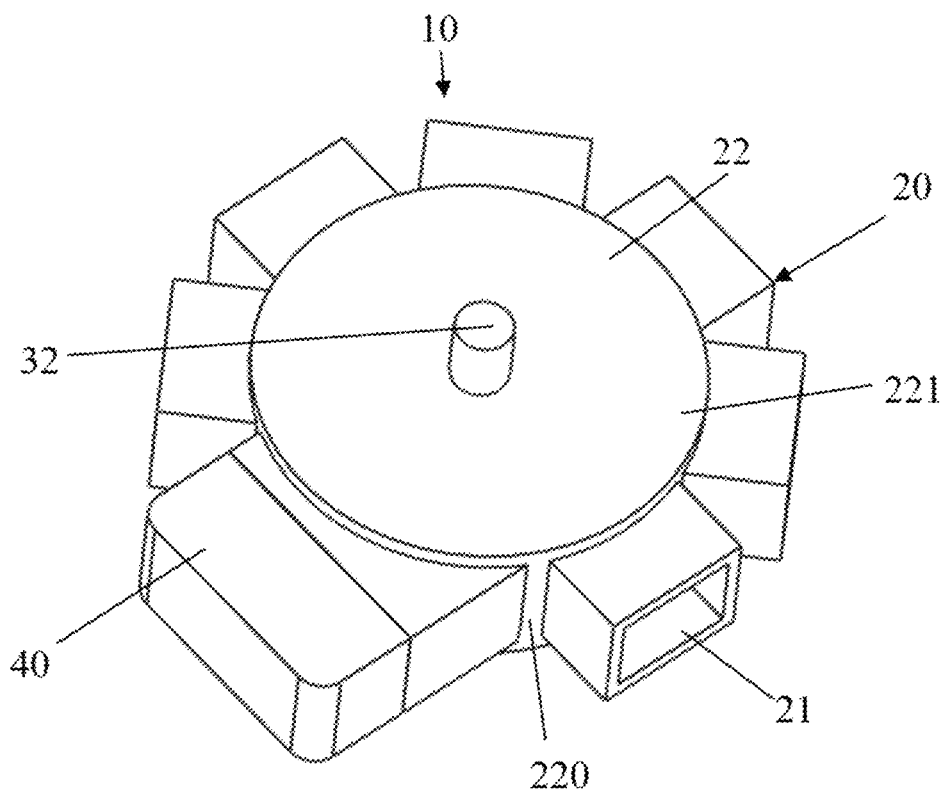
FIG. 1 is a schematic perspective view of a multi-port valve according to an embodiment of the present invention.
Figure 2:
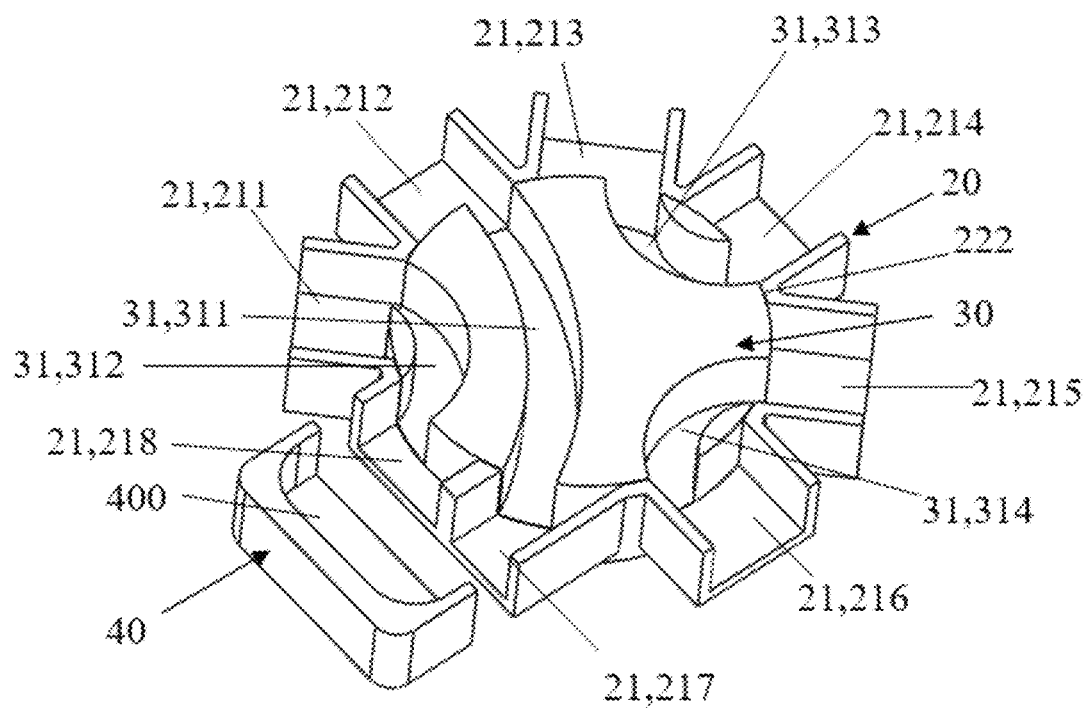
FIG. 2 is a perspective cross-sectional view of the multi-port valve shown in FIG. 1, where hatching is not shown for clarity.

Referring to FIG. 1 and FIG. 2, a multi-port valve 10 according to an embodiment of the present invention includes a valve housing 20 and a valve core 30 rotatably accommodated in the valve housing 20. The valve housing 20 includes a plurality of ports 21 distributed along the circumferential direction, at least some of which are configured to be connected with different external fluid circuits, e.g., cooling circuits, to enable interconnection therebetween. The valve core 30 is provided with a plurality of flow channels 31. The multi-port valve 10 has several work modes corresponding to the different positions of the valve core 30 relative to the valve housing 20. In different work modes, the flow channels 31 are configured to selectively communicate with different ports 21, so that selected external fluid circuits are configured to be in fluid communication through the multi-port valve 10 of present embodiment rather than through multiple valves as that in traditional solution. It is more compact in size and lower cost as compared to the traditional solution.

In particular, at least two of the flow channels 31 of the multi-port valve 10 of present embodiment are configured to be in fluid communication through the valve housing 20 itself rather than through an external fluid circuit. Then, each flow channels 31 can work independently in some work modes, or in other work modes, two of the flow channels 31 can be connected in series inside the valve to satisfy specific requirement of some applications (described in detail below). Therefore, the multi-port valve 10 can meet more diverse application requirements. Specifically, a guider passage with a radially outer end closed can be provided on the valve housing (see FIG. 4). When the valve core 30 is rotated to make two of the flow channels 31 to be in alignment and communication with the guider passage, thereby enabling interconnection of the two flow channels 31 inside the valve. Alternatively, a fluid guider 40 can be mounted to an outside of the valve housing 20, e.g., an outer circumferential side of the valve housing 20, to cover and communicate with two of the ports 21, preferably two adjacent ports 21. Then, the valve core can be rotated to make two of the flow channels 31 to be respectively aligned and in communication with the two ports 21 covered by the fluid guider 40 so as to enable the two flow channels 31 to be in fluid communication with each other through the fluid guider 40. The fluid guider 40 can be integrally formed with the valve housing 20. Preferably, as in one embodiment, the fluid guider 40 are independently formed as regard to the other parts of the valve housing 20 and then connected to the valve housing 20 to cover two of the ports 21, preferably two adjacent ports 21. In one embodiment, the fluid guider 40 can be attached to the valve housing 20 in a non-detachable manner, such as adhesion, which helps to improve the sealing performance of the connection between the fluid guider 40 and the valve housing 20. In another embodiment, the fluid guider 40 may be detachably attached to the valve housing 20, such as screwing. which helps to increase work flexibility of the multi-port valve 10. For example, in a specific application, the fluid guider 40 is mounted to the valve housing 20 to make the two ports 21 of the valve housing 20 to be communicated with each other via the fluid guider 40. In another situation, the fluid guider 40 is removed, so that the ports 21 are configured to be respectively connected with external fluid circuits.

Specifically, the valve housing 20 of this embodiment includes a hollow cylindrical main body 22, a plurality of arm portions to respectively define the ports 21 integrally formed on the circumferential wall of the main body 22, and the fluid guider 40 mounted to corresponding arm portions to cover two of the ports 21. Preferably, the main body 22 includes a hollow cylindrical base 220 with an open axial end, and an end plate 221 covering the opening of the base 220 to cooperatively form a cavity 222 for accommodating the valve core 30. The arm portions are circumferentially distributed on the circumferential wall of the base 220 and extends therethrough to enable the ports 31 to be in fluid communication with the cavity 222. The fluid guider 40 is shaped as a hollow box with an open side. The open side of the fluid guider 40 is aligned and communicates with two of the ports 21. So that the two ports 21 communicate with each other through a guider passage 400 defined inside the fluid guider 40. In one embodiment, the valve core 30 is cylindrical, and a rotating shaft 32 extending from a centre thereof. Two ends of the rotating shaft 32 are rotatably connected to the base 220 and the end plate 221 respectively. In use, the rotating shaft 32 is connected to an output shaft of a motor, which then drives the valve core 30 to rotate relative to the valve housing 20. Each of the flow channel 31 are arranged on a plane perpendicular to a central axis of the valve core 30. Each of the flow channel 31 extends through circumferential wall of the valve core 30 to form two opposite open ends configured to communicate with the corresponding ports 21 of the valve housing 20. The flow channels 31 are not in fluid commination inside the valve core 20.

Preferably, all of the flow channels 31 of the valve core 30 are located at a same axial level. The plurality of the ports includes 2n ports, which are all located at a same axial level, wherein n≥3. In different work modes, two of the ports 21 in alignment and communication with each of flow channels 31 may be different. That is, when the valve core 30 rotates through preset angle, at least one of two of the ports 21 in alignment and communication with each of the channel 31 is changed.

In present embodiment, the n=4. The plurality of the flow channels 31 includes a first flow channels 311, a second flow channels 312, a third flow channels 313, and a fourth flow channels 314 located at a same axial level. The second flow channels 312 is arranged on one of opposite sides of the first flow channels 311, The third and fourth flow channels 313, 314 are arranged on the other one of the opposite sides of the first flow channel 311. Preferably, the first flow channel 311 extends in an arcuate shape close to the centre of the valve core 30. The third flow channel 313 and the fourth flow channel 314 are symmetrically arranged with each other. The plurality of the ports 21 of the valve housing 20 includes a first port 211, a second port 212, a third port 213, a fourth port 214, a fifth port 215, a sixth port 216, a seventh port 217, and an eighth port 218 arranged in sequence along the circumferential direction. The seventh port 217 and the eighth port 218 are in fluid communication through the fluid guider 40. Preferably, all of the ports 21 are evenly distributed along the circumferential direction, and more preferably, central angles spanned by the ports 21 are substantially the same. With the valve core 30 rotating through a preset angle, each of the first, second, third, and fourth flow channels 311, 312, 313, and 314 selectively communicates with two of the first to the eighth ports 211 to 218. It can be understood that in different embodiments, the number and configurations of flow channels 31 and ports 21 can also be variable.

Referring to FIGS. 3A to 3E, different work modes of a thermal management system with the multi-port valve 10 of present embodiment are described.

The thermal management system of this embodiment includes the multi-port valve 10, a first external fluid circuit 51 with two ends thereof communicating with the first port 211 and the second port 212 of the multi-port valve 10 respectively, a second external fluid circuit 52 with two ends communicating with the third port 213 and the fourth port 214 of the valve 10 respectively, and a third external fluid circuit 53 with two ends communicating with the fifth port 215 and the sixth port 216 of the multi-port valve 10 respectively. A first pump 511, an electric drive device 512, and a radiator 513 are connected in series in the first external fluid circuit 51. A battery 521, a chiller 522, and a second pump 523 are connected in series in the second external fluid circuit 52. A heater 531 and a third pump 532 are connected in series in the third external fluid circuit 53.

Figure 3A:
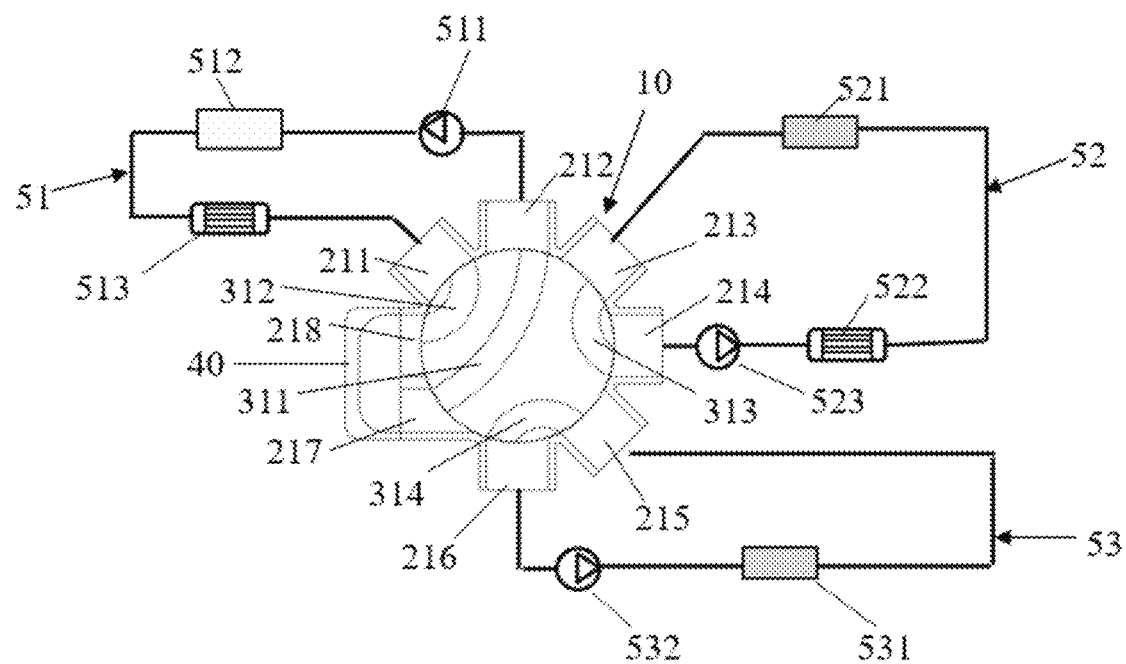
FIG. 3A is a schematic diagram of a thermal management system according to an embodiment of the present invention with the multi-port valve in a first work mode.

As shown in FIG. 3A the multi-port valve 10 is in the first work mode. The first channel 311 communicates with the second port 212 and the seventh port 217. The second channel 312 communicates with the first port 211 and the eighth port 218. The third flow channel 313 communicates with the third port 213 and the fourth port 214. The fourth flow channel 314 communicates with the fifth port 215 and the sixth port 216. Therefore, the first flow channel 311 and the second flow channel 312 are in fluid communication via the seventh port 217, the fluid guider 40, and the eighth port 218. In other words, the first flow channel 311 and the second flow channel 312 are connected in series within the valve housing 20 through the fluid guider 40. In the first work mode, opposite ends of the first circuit 51 are in fluid communication with each other through the first port 211, the second flow channel 312, the eighth port 218, the fluid guider 40, the seventh port 217, the second flow channel 312, and the second port 212 in sequence. Opposite ends of the second circuit 52 are in fluid communication with each other through the third port 213, the third flow channel 313, and the fourth port 214 in sequence. Opposite ends of the third circuit 53 are in fluid communication with each other through the fifth port 215, the fourth flow channel 314, and the sixth port 216 in sequence. That is, the first circuit 51, the second circuit 52, and the third circuit 53 are independent from one another.

Figure 3B:
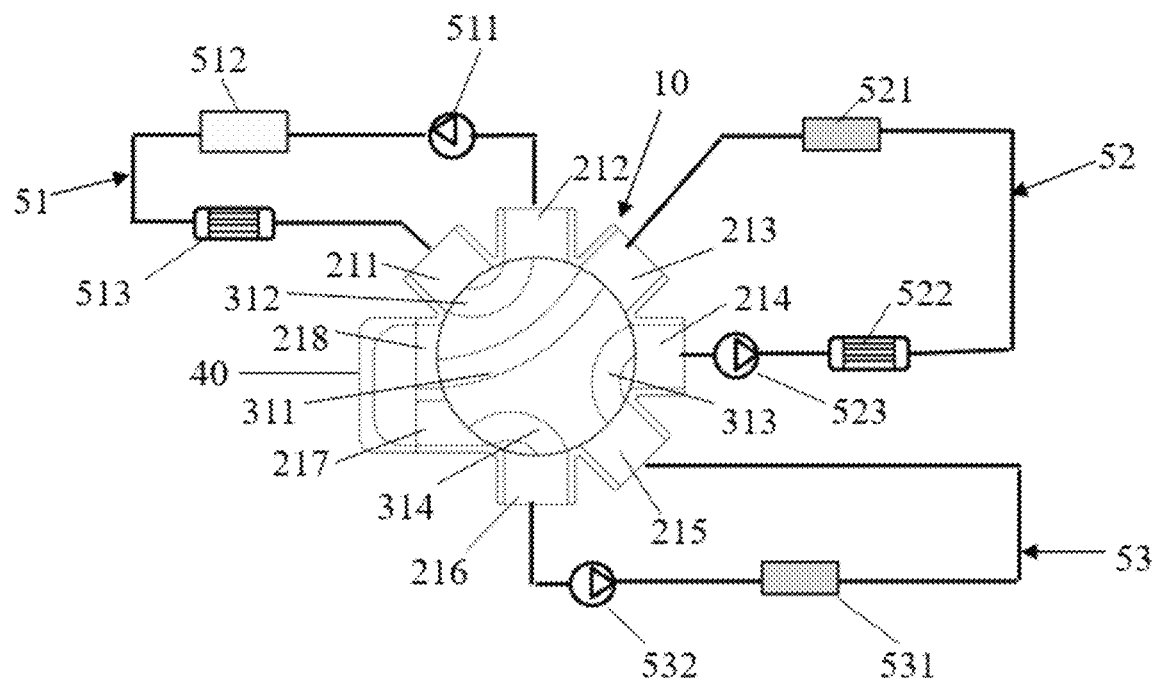
FIG. 3B is a schematic diagram of a thermal management system according to an embodiment of the present invention with the multi-port valve in a second work mode.

As shown in FIG. 3B, the multi-port valve 10 is in the second work mode. The first channel 311 communicates with the third port 213 and the eighth port 218. The second channel 312 communicates with the first port 211 and the second port 212. The third flow channel 313 communicates with the fourth port 214 and the fifth port 215. The fourth flow channel 314 communicates with the sixth port 216 and the seventh port 217. Therefore, the first flow channel 311 and the fourth flow channel 314 are in fluid communication with each other via the seventh port 217, the fluid guider 40, and the eighth port 218. In other words, the first flow channel 311 and the fourth flow channel 314 are connected in series within the valve housing 20 through the fluid guider 40. In the second work mode, opposite ends of the first circuit 51 are in fluid communication with each other through the first port 211, the second flow channel 312, the second port 212 in sequence. The second circuit 52 and the third circuit 53 are connected in series thereby in fluid communication with each other through the fourth port 214. the third channel 313, the fifth port 215, the sixth port 216, the fourth channel 314, the seventh port 217, the fluid guider 40, the eighth port 218, the first channel 311, and the third port 213 in sequence. That is, the first circuit 51 works independently. The second circuit 52 and the third circuit 53 are connected in series via the multi-port valve 10.

Figure 3C:
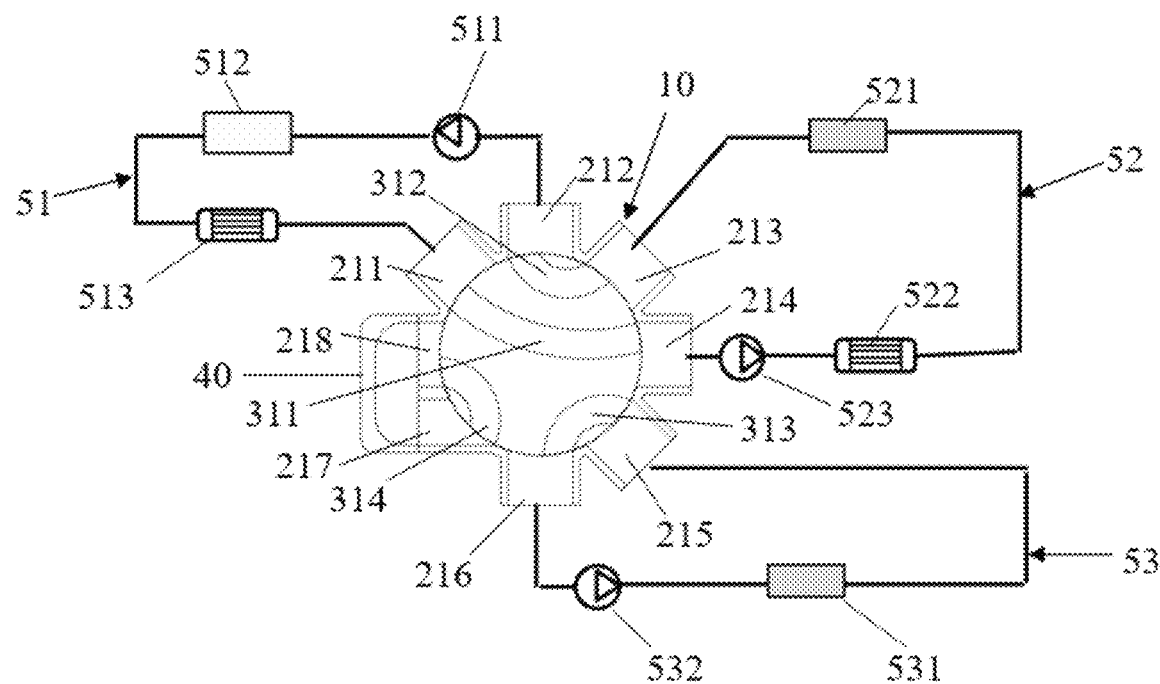
FIG. 3C is a schematic diagram of a thermal management system according to an embodiment of the present invention with the multi-port valve in a third work mode.

As shown in FIG. 3C, the multi-port valve 10 is in the third work mode. The first channel 311 communicates with the first port 211 and the fourth port 214. The second channel 312 communicates with the second port 212 and the third port 213. The third channel 313 communicates with the fifth port 215 and the sixth port 216. The fourth channel 314 communicates with the seventh port 217 and the eighth port 218. In the third work mode, the first circuit 51 and the second circuit 52 are connected in series thereby in fluid communication with each other through the first port 211, the first channel 311, the fourth port 214, the third port 213, the second channel 312, and the second port 212 in sequence. Opposite ends of the third circuit 53 are in fluid communication with each other through the fifth port 215, the third channel 313, and the sixth port 216 in sequence. That is, the first circuit 51 and the second circuit 52 are connected in series via the multi-port valve 10. The third circuit 53 works independently.

Figure 3D:
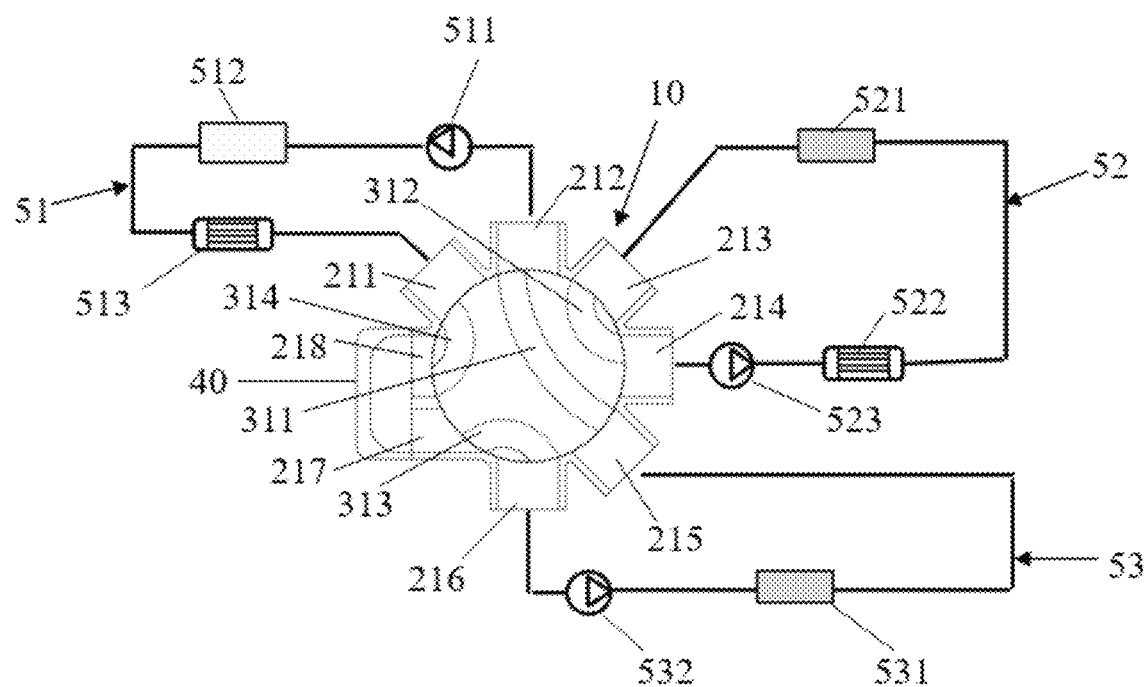
FIG. 3D is a schematic diagram of a thermal management system according to an embodiment of the present invention with the multi-port valve in a fourth work mode.

As shown in FIG. 3D, the multi-port valve 10 is in the fourth work mode. The first channel 311 communicates with the second port 212 and the fifth port 215. The second channel 312 communicates with the third port 213 and the fourth port 214. The third flow channel 313 communicates with the sixth port 216 and the seventh port 217. The fourth flow channel 314 communicates with the eighth port 218 and the first port 211. Therefore, the third flow channel 313 and the fourth flow channel 314 are in fluid communication with each other via the seventh port 217, the fluid guider 40, and the eighth port 218. In other words, the third flow channel 313 and the fourth flow channel 314 are connected in series within the valve housing 20 through the fluid guider 40. In the fourth work mode, the first circuit 51 and the third circuit 53 are connected in series thereby in fluid communication with each other through the first port 211, the fourth channel 314, the eighth port 218, the fluid guider 40, the seventh port 217, the third channel 313, the sixth port 216, the fifth port 215, the first channel 311, and the second port 212 in sequence. Opposite ends of the second circuit 52 in fluid communication with each other through the third port 213, the second channel 312, and the fourth port 214 in sequence. That is, the first circuit 51 and the third circuit 53 are connected in series via the multi-port valve 10. The second circuit 52 operates independently.

Figure 3E:
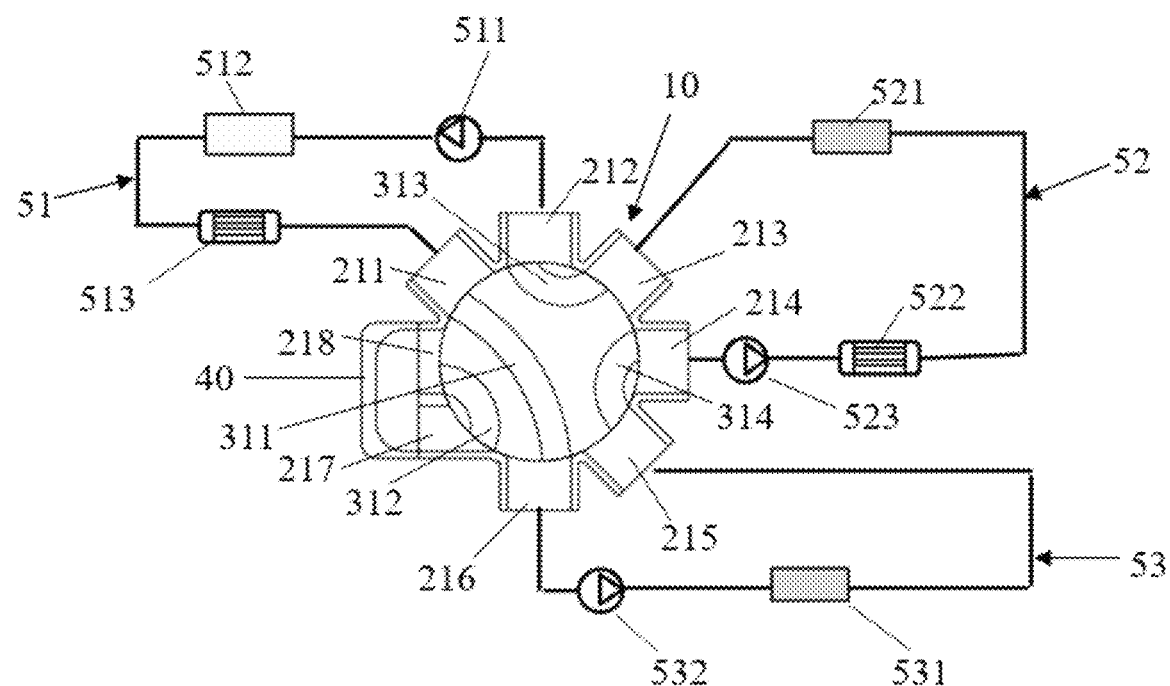
FIG. 3E is a schematic diagram of a thermal management system according to an embodiment of the present invention with the multi-port valve in a fifth work mode.

As shown in FIG. 3E, the multi-port valve 10 is in the fifth work mode. The first channel 311 communicates with the first port 211 and the sixth port 216. The second channel 312 communicates with the seventh port 217 and the eighth port 218. The third flow channel 313 communicates with the second port 212 and the third port 213. The fourth channel 314 communicates with the fourth port 214 and the fifth port 215. In the fifth work mode, the first circuit 51, the second circuit 52, and the third circuit 53 are connected in series thereby in fluid communication with one other through the first port 211, the first channel 311, the sixth port 216, the fifth port 215, the fourth channel 314, the fourth port 214, the third port 213, the third channel 313, and the second port 212 in sequence.

According to the description above, in the first, second and fourth work mode, it is necessary to connect two channels in series within the valve housing 20 through the fluid guider 40. Therefore, the provision of the fluid guider 40 provide more applicability of the multi-port valve 10 of the present invention.

Figure 4:
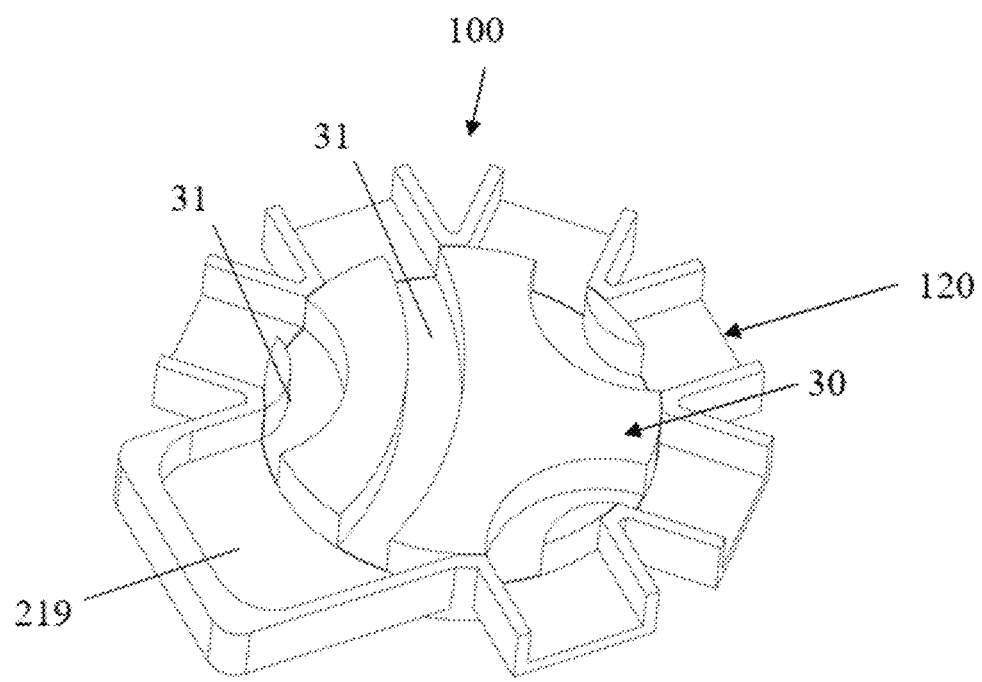
FIG. 4 is a schematic perspective view of a multi-port valve according to another embodiment of the present invention.

Referring to FIG. 4, the multi-port valve 100 of another embodiment of the present invention is similar to the multi-port valve 10 of the aforementioned embodiment. In the multi-port valve 100, without the fluid guider 40 as in the multi-port valve 10 of the aforementioned embodiment, two selective flow channels 31 of the valve core 30 are configured to be connected in series through a guider passage 219 defined in valve housing 120 of a valve housing 120. Specifically, a protruding portion integrally formed with a base of the valve housing 120. The guider passage 219 defined in the protruding portion and radially extends from the base of the valve housing 120. In at least one work mode, two of the flow channels 31 of the valve core 30 are both aligned with the fluid guiding passage 219, thereby being connected in series within the valve housing 120.

Although certain inventive embodiments of the present disclosure have been specifically described, the present disclosure is not to be construed as being limited thereto. Various changes or modifications may be made to the present disclosure without departing from the scope and spirit of the present disclosure.

The invention claimed is:

1. A multi-port valve, comprising:
    a valve housing comprising a cylindrical main body defining an inner cavity and a plurality of ports in fluid communication with the inner cavity;
    a valve core rotatably accommodated in the inner cavity, the valve core defining a plurality of flow channels, each extending through a sidewall of the valve core to form two opposite open ends;
    wherein the flow channels are in fluid isolation with each other inside the valve core, the valve housing is provided with a guider passage, and the plurality of flow channels include a first flow channel, a second flow channel and a third flow channel; the multi-port valve is operable to be switched between a plurality of work modes in response to the valve core rotating to different positions relative to the valve housing, the first flow channel is connected in series with the second flow channel via the guider passage but kept in fluid isolation with the third flow channel in response to one of the work modes; the first flow channel is connected in series with the third flow channel via the guider passage but kept in fluid isolation with the second flow channel in response to another one of the work modes wherein at least two of the ports of the plurality of ports are always in communication with the guider passage.

2. The multi-port valve of claim 1, wherein the guider passage is defined in a protruding portion integrally formed with the main body of the valve housing, two of the flow channels of the valve core are configured to be both aligned and in fluid communication with the guider passage, thereby being connected in series within the valve housing.

3. The multi-port valve of claim 1, wherein a fluid guider is attached to the main body of the valve housing, the guider passage is defined in the fluid guider, two of the plurality of ports are covered by the fluid guider and in fluid communication with each other through the fluid guider.

4. The multi-port valve of claim 2, wherein the fluid guider is integrally formed with the main body of the valve housing.

5. The multi-port valve of claim 3, wherein the fluid guider is independently formed with respect to the main body of the valve housing, and then connected to the main body of the valve housing in a detachable or non-detachable manner.

6. The multi-port valve of claim 4, wherein the valve housing further includes a plurality of arm portions integrally formed on the circumferential wall of the main body, the ports are respectively defined in the arm portions, the fluid guider is attached to two of the arm portions to cover two of the ports.

7. The multi-port valve of claim 6, wherein the fluid guider is shaped as a hollow box with an open side, the open side of the fluid guider is aligned and communicates with two of the ports.

8. The multi-port valve according to claim 1, wherein the valve core includes n flow channels, and the valve housing includes 2n ports, and n≥3.

9. The multi-port valve of claim 1, wherein in different working modes, each of the flow channels is configured to selectively communicate with two different ports.

10. A thermal management system, wherein the thermal management system comprises the multi-port valve of claim 1.

* * * * *